US012770017B2

(12) United States Patent
Kumar et al.

(10) Patent No.: US 12,770,017 B2
(45) Date of Patent: Oct. 20, 2026

(54) SYSTEMS AND METHODS FOR GENERATING SCANPATHS

(71) Applicant: Adobe Inc., San Jose, CA (US)

(72) Inventors: Yaman Kumar, New Delhi (IN); Varun Khurana, New Delhi (IN)

(73) Assignee: Adobe Inc., San Jose, CA (US)

( * ) Notice: Subject to any disclaimer, the term of this patent is extended or adjusted under 35 U.S.C. 154(b) by 480 days.

(21) Appl. No.: 18/109,990

(22) Filed: Feb. 15, 2023

(65) Prior Publication Data

US 2024/0273377 A1 Aug. 15, 2024

(51) Int. Cl.

*G06F 40/00* (2020.01)
*G06F 40/151* (2020.01)
*G06F 40/30* (2020.01)
*G06F 40/40* (2020.01)
*G06N 3/047* (2023.01)
*G06N 3/094* (2023.01)
*G06F 40/166* (2020.01)
*G06F 40/284* (2020.01)

(52) U.S. Cl.

CPC ........... *G06N 3/094* (2023.01); *G06F 40/151* (2020.01); *G06F 40/30* (2020.01); *G06F 40/40* (2020.01); *G06N 3/047* (2023.01); *G06F 40/166* (2020.01); *G06F 40/284* (2020.01)

(58) Field of Classification Search

CPC .... G06F 40/211; G06F 40/253; G06F 40/268; G06F 40/284; G06F 40/30; G06F 40/151; G06F 40/166; G06F 40/40; G10L 15/16; G10L 19/00; G10L 19/005; G10L 25/27; G10L 25/30; G10L 15/02; G10L 15/12; G10L 15/063; G10L 15/1822; G10L 15/183; G10L 15/19; G10L 15/193; G10L 17/18; G10L 15/1815; G06N 3/094; G06N 3/047; G06N 3/045; G06N 3/044; G06N 3/084

See application file for complete search history.

(56) References Cited

U.S. PATENT DOCUMENTS 12,242,568 B2 * 3/2025 Kobren .................. G06F 40/56
2020/0364539 A1 * 11/2020 Anisimov .............. G06F 3/011
2024/0265204 A1 * 8/2024 Meeks ................. G06F 40/279

OTHER PUBLICATIONS

Assens et al., PathGAN: Visual Scanpath Prediction with Generative Adversarial Networks, Computer Vision—ECCV Workshops, 2018, 18 pages.

(Continued)

*Primary Examiner* — Vu B Hang

(74) *Attorney, Agent, or Firm* — Kilpatrick Townsend & Stockton LLP

(57) ABSTRACT

Some embodiments described herein relate to a training module comprising a scanpath generation model training system. The training module may be used to generate a scanpath generation model. The training module may comprise an adversarial training neural network. Using training data, which includes a text input and a recorded scanpath corresponding to the text input, the adversarial training neural network is trained to generate a scanpath generation model. A scanpath may comprise a sequence of words and a corresponding sequence of fixation durations, wherein the sequence of words comprises one or more words comprising the text input. The training module may then output the trained scanpath generation model.

20 Claims, 9 Drawing Sheets

(56) References Cited

OTHER PUBLICATIONS

Barrett et al., Cross-lingual Transfer of Correlations between Parts of Speech and Gaze Features, Proceedings of COLING 2016, the 26th International Conference on Computational Linguistics: Technical Papers, Dec. 2016, pp. 1330-1339.
Barrett et al., Sequence Classification with Human Attention, Proceedings of the 22nd Conference on Computational Natural Language Learning (CoNLL), 2018, pp. 302-312.
Barrett et al., Sequence Labelling and Sequence Classification with Gaze: Novel Uses of Eye-tracking Data for Natural Language Processing, Language and Linguistics Compass, vol. 14, Issue 11, Sep. 22, 2020, 16 pages.
Barrett et al., Unsupervised Induction of Linguistic Categories with Records of Reading, Speaking, and Writing, Proceedings of the Conference of the North American Chapter of the Association for Computational Linguistics: Human Language Technologies, vol. 1 (Long Papers), Jun. 2018, pp. 2028-2038.
Barrett et al., Weakly Supervised Part-of-speech Tagging Using Eye-tracking Data, Proceedings of the 54th Annual Meeting of the Association for Computational Linguistics (vol. 2: Short Papers), Aug. 2016, pp. 579-584.
Berzak et al., CELER: A 365-participant Corpus of Eye Movements in L1 and L2 English Reading, Open Mind, vol. 6, Jul. 1, 2022, pp. 41-50.
Blohm et al., Comparing Attention-Based Convolutional and Recurrent Neural Networks: Success and Limitations in Machine Reading Comprehension, Proceedings of the 22nd Conference on Computational Natural Language Learning, Oct. 2018, pp. 108-118.
Boyd et al., Human-aided Saliency Maps improve Generalization of Deep Learning, Proceedings of the IEEE/CVF Winter Conference on Applications of Computer Vision, 2022, pp. 2735-2744.
Chen et al., Scanpath Prediction for Visual Attention using IOR-ROI LSTM, Proceedings of the Twenty-Seventh International Joint Conference on Artificial Intelligence (IJCAI), 2018, pp. 642-648.
Clifton et al., Chapter 15—Eye Movements in Reading Words and Sentences, Eye Movements, 2007, pp. 341-371.
Cristino et al., ScanMatch: A Novel Method for Comparing Fixation Sequences, Behavior Research Methods, vol. 42, No. 3, Aug. 2010, pp. 692-700.
De Belen et al., ScanpathNet: A Recurrent Mixture Density Network for Scanpath Prediction, IEEE/CVF Conference on Computer Vision and Pattern Recognition Workshops (CVPRW), 2022, pp. 5010-5020.
Demberg et al., Data from Eye-tracking Corpora as Evidence for Theories of Syntactic Processing Complexity, Cognition, vol. 109, No. 2, Nov. 2008, pp. 193-210, pp. 1-32.
Devlin et al., BERT: Pre-Training of Deep Bidirectional Transformers for Language Understanding, In Proceedings of the Conference of the North American Chapter of the Association for Computational Linguistics: Human Language Technologies, vol. 1, May 24, 2019, 16 pages.
Engbert et al., SWIFT: A Dynamical Model of Saccade Generation during Reading, Psychological Review, vol. 112, No. 4, Nov. 2005, pp. 777-813.
Hahn et al., Modeling Human Reading with Neural Attention, Proceedings of the Conference on Empirical Methods in Natural Language Processing, Nov. 2016, pp. 85-95.
He et al., Human Attention in Image Captioning: Dataset and Analysis, IEEE/CVF International Conference on Computer Vision (ICCV), 2019, pp. 8529-8538.
Hollenstein et al., Advancing NLP with Cognitive Language Processing Signals, arXiv:1904.02682, Available Online at: https://arxiv.org/abs/1904.02682, 2019, 11 pages.
Hollenstein et al., Entity Recognition at First Sight: Improving NER with Eye Movement Information, NAACL: Human Language Technologies, vol. 1 (Long and Short Papers), 2019, pp. 1-10.
Hollenstein et al., CMCL 2021 Shared Task on Eye-Tracking Prediction, In Proceedings of the Workshop on Cognitive Modeling and Computational Linguistics, Jun. 10, 2021, pp. 72-78, Online, Association for Computational Linguistics.
Hollenstein et al., Multilingual Language Models Predict Human Reading Behavior, In Proceedings of the 2021 Conference of the North American Chapter of the Association for Computational Linguistics: Human Language Technologies, Jun. 6-11, 2021, pp. 106-123, Online, Association for Computational Linguistics.
Jarodzka et al., A Vector-based, Multidimensional Scanpath Similarity Measure, Proceedings of the symposium on eye-tracking research & applications, Mar. 22, 2010, pp. 211-218.
Jiang et al., Learning to Predict Sequences of Human Visual Fixations, IEEE transactions on neural networks and learning systems, vol. 27, No. 6, Jun. 6, 2016, pp. 1241-1252.
Joshi et al., Harnessing Context Incongruity for Sarcasm Detection, ACL-IJCNLP (vol. 2: Short Papers), 2015, pp. 757-762.
Just et al., A Theory of Reading: From Eye Fixations to Comprehension, Psychological Review, vol. 87, No. 4, Jul. 1980, pp. 329-354.
Karessli et al., Gaze Embeddings for Zero-shot Image Classification, IEEE Conference on Computer Vision and Pattern Recognition (CVPR), 2017, pp. 4525-4534.
Klerke et al., Improving Sentence Compression by Learning to Predict Gaze, Proceedings of the Conference of the North American Chapter of the Association for Computational Linguistics: Human Language Technologies, Jun. 2016, pp. 1528-1533.
Kotseruba et al., 40 Years of Cognitive Architectures: Core Cognitive Abilities and Practical Applications, Artificial Intelligence Review, vol. 53, 2020, pp. 17-94.
Kummerer et al., DeepGaze III: Modeling free-viewing Human Scanpaths with Deep Learning, Journal of Vision, vol. 22, No. 5, Apr. 2022, pp. 1-27.
Kummerer et al., State-of-the-art in Human Scanpath Prediction, arXiv:2102.12239, Available Online at: https://arxiv.org/abs/2102.12239, 2021, pp. 1-20.
Levenshtein, V.I., Binary Codes Capable of Correcting Deletions, Insertions, and Reversals, Soviet Physics—Doklady, vol. 10, No. 8. Feb. 1966, pp. 707-710. (Presented by Academician P.S. Novikov, Jan. 4, 1965, Translated from Doklady Akademii Nauk SSSR, vol. 163, No. 4, pp. 845-848, Aug. 1965, original article submitted Jan. 2, 1965).
Long et al., A Cognition Based Attention Model for Sentiment Analysis, Proceedings of the Conference on Empirical Methods in Natural Language Processing, Sep. 2017, pp. 462-471.
Marcinkiewicz et al., Building a large annotated corpus of English: The Penn Treebank, Computational Linguistics, Special Issue on Using Large Corpora: II, vol. 19, No. 2, Jun. 1993, pp. 313-330.
Martin et al., ScanGAN360: A Generative Model of Realistic Scanpaths for 360° Images, IEEE Transactions on Visualization and Computer Graphics, vol. 28, No. 5, 2022.
Mathias et al., A Survey on Using Gaze Behaviour for Natural Language Processing, Proceedings of the Twenty-Ninth International Joint Conference on Artificial Intelligence (IJCAI), 2020, pp. 4907-4913.
Matthies et al., With Blinkers on: Robust Prediction of Eye Movements Across Readers, Proceedings of the Conference on Empirical Methods in Natural Language Processing, Oct. 2013, pp. 803-807.
Mishra et al., Harnessing Cognitive Features for Sarcasm Detection, Proceedings of the 54th Annual Meeting of the Association for Computational Linguistics (vol. 1: Long Papers), Aug. 2016, pp. 1095-1104.
Mishra, et al., Leveraging Cognitive Features for Sentiment Analysis, Proceedings of the 20th SIGNLL Conference on Computational Natural Language Learning, Aug. 2016, pp. 156-166.
Mishra et al., Predicting Readers' Sarcasm Understandability by Modeling Gaze Behavior, Association for the Advancement of Artificial Intelligence (AAAI), 2016, 7 pages.
Mishra et al., Scanpath Complexity: Modeling Reading Effort using Gaze Information, Thirty-First AAAI Conference on Artificial Intelligence, Feb. 12, 2017, 8 pages.
Pang et al., A Sentimental Education: Sentiment Analysis using Subjectivity Summarization Based on Minimum Cuts, ACL Anthology, 2004, 8 pages.

(56) References Cited

OTHER PUBLICATIONS

Plank, Keystroke Dynamics as Signal for Shallow Syntactic Parsing, Proceedings of COLING, the 26th International Conference on Computational Linguistics: Technical Papers, Dec. 2016, pp. 609-619.
Rayner et al., Eye Movements as Reflections of Comprehension Processes in Reading, Scientific Studies of Reading—Sci Stud Read, vol. 10, No. 3, 2006, pp. 241-255.
Reich et al., Inferring Native and Non-Native Human Reading Comprehension and Subjective Text Difficulty from Scanpaths in Reading, ETRA: Symposium on Eye Tracking Research and Applications, vol. 23, Jun. 2022, pp. 1-8.
Ren et al., CogAlign: Learning to Align Textual Neural Representations to Cognitive Language Processing Signals, ACL-IJCNLP (vol. 1: Long Papers), 2021, pp. 3758-3769.
Samardzhiev et al., Learning Neural Word Salience Scores, Proceedings of the Seventh Joint Conference on Lexical and Computational Semantics, Jun. 2018, pp. 33-42.
Seo et al., Neural Speed Reading via Skim-RNN, International Conference on Learning Representations (ICLR), 2018, pp. 1-14.
Sood et al., Improving Natural Language Processing Tasks with Human Gaze-guided Neural Attention, NeurIPS, 2020, 15 pages.
Strzyz et al., Towards Making a Dependency Parser See, EMNLP-IJCNLP, 2019, pp. 1500-1506.
Sun et al., Visual Scanpath Prediction using IOR-ROI Recurrent Mixture Density Network, IEEE Transactions on Pattern Analysis and Machine Intelligence, vol. 43, No. 6, 2019, pp. 2101-2118.
Wang et al., GLUE: A Multi-task Benchmark and Analysis Platform for Natural Language Understanding, In Proceedings of the 2018 EMNLP Workshop BlackboxNLP: Analyzing and Interpreting Neural Networks for NLP, Nov. 2018, pp. 353-355.
Wang et al., Learning Sentence Representation with Guidance of Human Attention, Proceedings of the Twenty-Sixth International Joint Conference on Artificial Intelligence (IJCAI), 2017, pp. 4137-4143.
Wang et al., Salient Object Detection in the Deep Learning Era: An In-depth Survey, IEEE Transactions on Pattern Analysis and Machine Intelligence, vol. 44, Jun. 2022, pp. 3239-3259.
Xia et al., Automatic Learner Summary Assessment for Reading Comprehension, Proceedings of the Conference of the North American Chapter of the Association for Computational Linguistics: Human Language Technologies, vol. 1 (Long and Short Papers), Jun. 2019, pp. 2532-2542.
Yu et al., Supervising Neural Attention Models for Video Captioning by Human Gaze Data, 2017, pp. 490-498.
Zhang et al., ReCoRD: Bridging the Gap between Human and Machine Commonsense Reading Comprehension, arXiv:1810.12885, Available Online at: https://arxiv.org/abs/1810.12885, 2018, 14 pages.

* cited by examiner

SYSTEMS AND METHODS FOR GENERATING SCANPATHS

TECHNICAL FIELD

This disclosure generally relates to machine learning and, more specifically, to scanpath generation.

BACKGROUND

Natural language processing (NLP) models have a variety of applications, including sentiment analysis, text classification, and others. Digital traces of human cognitive processing can provide valuable signals for training NLP models. The movement of the human eye during reading, or eye tracking, is an example of one such signal. For instance, a recorded data set of eye tracking data developed across a well-known corpus can augment a machine learning model as an auxiliary task in multi-task learning or be used as an embedded representation input to a neural network.

While recorded eye tracking data has been proven to improve some NLP models, the real-world application of these methods remains limited. The equipment required to record eye tracking data is expensive. Additionally, the equipment is cumbersome and requires significant manual labor to set up and use under controlled conditions. Where eye tracking data can be obtained, for instance, through a web cam or similar commercial device, users might have significant privacy concerns associated with the obtaining of such recordings.

SUMMARY

Some embodiments described herein relate to a training module comprising a scanpath generation model training system. The training module may be used to generate a scanpath generation model. The training module may comprise an adversarial training neural network. Using training data, which includes a text input and a recorded scanpath corresponding to the text input, the adversarial training neural network may be trained to generate a scanpath generation model. A scanpath may comprise a sequence of words and a corresponding sequence of fixation durations, wherein the sequence of words comprises one or more words comprising the text input. The training module may then output the trained scanpath generation model.

In some embodiments, the adversarial training neural network may include a conditional generator. The conditional generator may receive the text input from the training data. The conditional generator can transform the text input into a generated scanpath. A discriminator also receives the text input as well as the generated scanpath, or alternatively, a recorded scanpath from the training data. The discriminator determines a first probability that the generated scanpath is a recorded scanpath and a second probability that the recorded scanpath is a recorded scanpath. The conditional generator is trained using the first probability, the second probability, the recorded scanpath, and the generated scanpath. The discriminator is trained using the first probability and the second probability.

In some embodiments, generating the scanpath generation model may include transforming the text input into a dense text representation using a pre-trained neural network. The dense text representation may be used to condition the conditional generator and the discriminator. In some embodiments, generating the scanpath generation model may include transforming the dense text representation of the text input into a reconstruction of the text input. In such embodiments, the dense text representation and the reconstruction of the text input may be used to train the conditional generator. In some embodiments, the generated scanpath may include an end-of-sequence probability.

In some embodiments, the trained scanpath generation model may be used to augment one or more natural language processing models. The natural language processing models may also be trained using scanpaths generated by the trained scanpath generation model. In some embodiments, the training data may include feedback from one or more client devices utilizing the trained scanpath generation model. The scanpath generation model may be further trained based on the feedback from one or more client devices.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
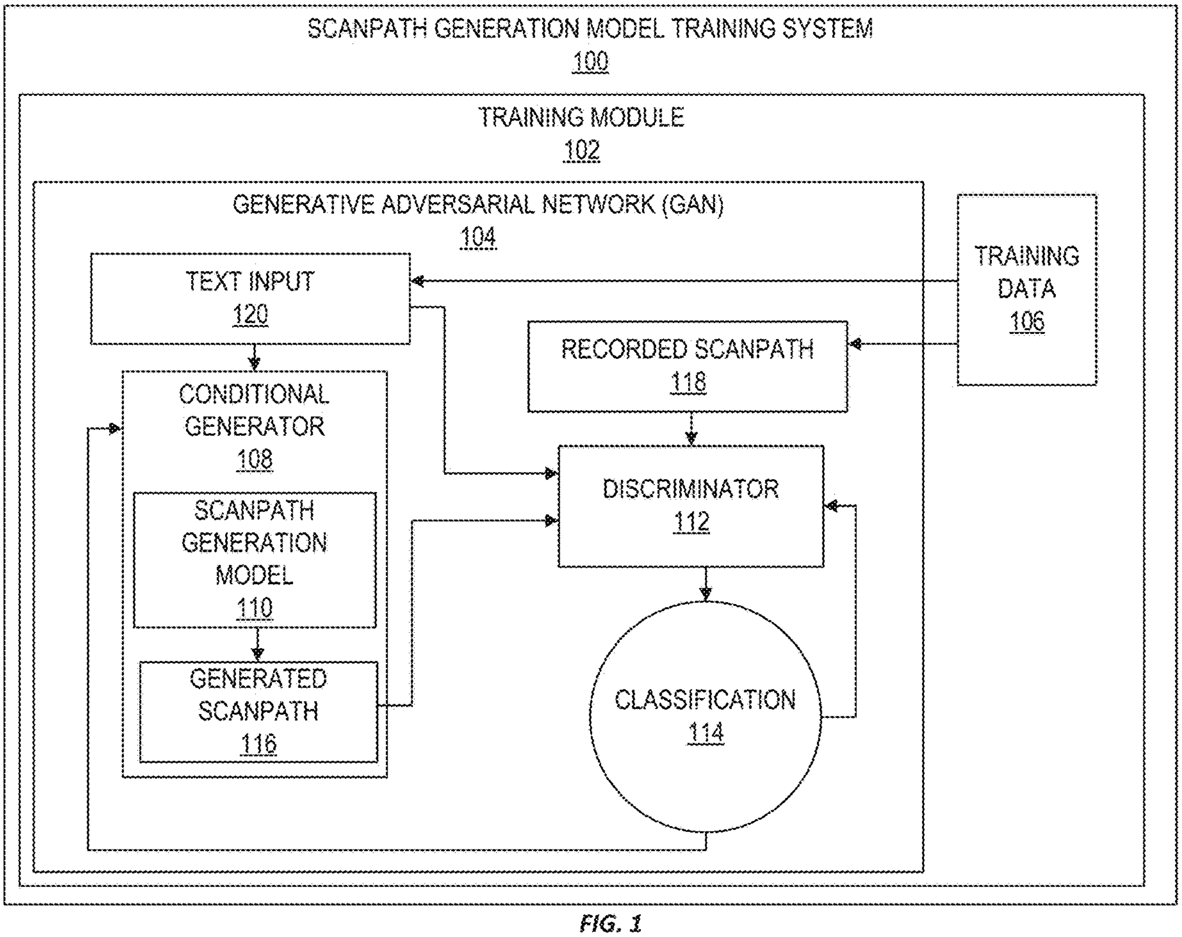
FIG. 1 is a diagram of an example of a scanpath generation model training system, according to some embodiments described herein.

As described above, obtaining recorded eye tracking data for use in augmenting and improving natural language processing (NLP) models can be impractical due to cost, effort, and privacy concerns. However, corpora of eye tracking data obtained from academic or other research settings may be available for developing machine learning models. Some embodiments described herein use a training module, which is or includes a machine-learning model trained to generate scanpaths that mirror those that would be derived from an actual recording of the human eye reading a given text. Generated scanpaths can then be used, for example, to train NLP models at significantly reduced cost and effort, with no privacy considerations. The training module may first access training data to train the machine-learning model. For example, the training data may include text inputs and recorded scanpaths derived from eye tracking data recorded while the text inputs obtained from research corpora were read by humans. The training module may include an adversarial training neural network, such as a generative adversarial network (GAN). The adversarial training neural network may be trained, using the training data, to generate a trained scanpath generation model. The training module may then output the trained scanpath generation model, which can then be used to generate scanpaths for various applications.

The following non-limiting example is provided to introduce certain embodiments. In this example, a training module is incorporated in a scanpath generation model training system. The training module can generate a scanpath generation model, which may then be used to generate realistic scanpaths for various applications.

In this example, the training module includes a GAN, which comprises two competing neural networks: a conditional generator and a discriminator. The conditional generator generates scanpaths given a text input. The output of the conditional generator is input to the discriminator, along with the text input. Alternatively, the discriminator may receive the recorded scanpath data for the same text input. The discriminator distinguishes recorded human scanpaths from the generated scanpaths. The outcome of the discriminator's determination is used to train both the discriminator and the conditional generator. The discriminator is penalized for incorrect determinations and the conditional generator is rewarded for generating a scanpath that the discriminator cannot correctly distinguish from the recorded one. Thus, in a zero-sum fashion, the conditional generator and the discriminator are adversarially trained together to train the scanpath generation model.

Certain embodiments described herein represent improvements in the technical fields of machine learning, NLP, and saliency prediction. Once the scanpath generation model is trained, it can be used as a pre-trained model for a variety of applications. For instance, the pre-trained model can be provided with a text input and configured to output a generated scanpath which can be used to improve and evaluate NLP models. Some example NLP models suffer from an accuracy gap, wherein the model is inaccurate because it is not trained on domain-specific training data. In these examples, the accuracy gap can be improved with the addition of the cognitive signals provided by generated scanpaths.

Another example application includes saliency prediction. The pre-trained model can be provided with a text input and configured to output a generated scanpath which can be used as feedback to adjust the text input to achieve various optimizations. For instance, the generated scanpath can be used to select the words and word ordering of text to help ensure that the reader's fixation duration is maximized on certain key words and phrases. In some examples, saliency analysis is applied to text including content intended to capture a reader's attention and interest. Examples of such content may include emergency alerts, advertisements, or time-sensitive messages, among other possibilities. A reader may form an opinion in the first few seconds of viewing content. Therefore, which words the reader reads in those first few seconds may be of significant importance to the authors of the text. In some examples, the wording of the content may confuse readers or cause them to ignore the text altogether. In both examples, a generated scanpath associated with the text comprising may be used to optimize the impact of the content and better achieve the goal of capturing the reader's attention and interest.

In some examples, saliency analysis may be used to optimize text in other contexts. For instance, an author may begin with an idea and then apply saliency analysis to select the wording to communicate the idea. In another example, an author may create a piece of text, and then submit a portion of the text for saliency analysis, to receive recommendations for how the text may be optimized to achieve a particular goal.

In some examples, intent-aware scanpath generation can be implemented in concert with downstream NLP tasks. For example, the performance of an NLP model with generated scanpath data incorporated may be determined. The performance can be used to determine a gradient that can be fed back to the conditional generator. Conditioning scanpath generation on NLP tasks may bias the conditional generator 108 towards words that are relevant for the particular NLP task and could therefore boost the performance of the downstream NLP task.

As used herein, the term "scanpath" refers to a sequence representing the eye tracking data of a human eye reading a given text input. A scanpath can be either recorded or generated, for example, by a machine learning model. A recorded scanpath may also be called ground truth eye tracking data. For a text input comprising one or more words arranged in an ordered sequence, the ordered sequence comprises zero or more ordered pairs, each pair comprising a word, or fixation point, and the fixation duration of the word. The fixation duration is the amount of time the human eye remains fixed on a given word. The scanpath sequence need not be in the same order as the words comprising the text input, nor is every word from the text input necessarily contained in the scanpath.

As used herein, the term "eye tracking" refers to the conversion of the physical movements and positioning of the human eye into a quantifiable data set. In some instances, the eye tracking data is extracted from video images captured of the human eye while reading a given text string.

As used herein, the term "scanpath generation model" refers to a set of software instructions that implement a machine learning model. For example, the scanpath generation model may be a pre-trained neural network that generates scanpaths given a text input. In another example, the scanpath generation model may be a component of an adversarial training neural network.

As used herein, the term "scanpath generation model training system" refers to a computer system configured to be used by a human user or an automated user to generate scanpath generation models for the purpose of, for example, augmenting natural language processing models or saliency analysis. In some embodiments, a scanpath generation model training system is implemented as one or more computing devices running program code to cause a processing unit to execute machine learning algorithms, access data, or perform other tasks on datasets.

As used herein, the term "training module" refers to a computer-implemented component configured to execute one or more neural networks to implement a machine learning algorithm. In some embodiments, a training module is implemented as software instructions, which, when executed by a processing unit, causes the processing unit to train one or more neural networks.

As used herein, the term "natural language processing" refers to the discipline concerned with the ability of computers to process, analyze, and model large amounts of natural language data. Results of such models can provide a basis for a spectrum of useful applications including searching, machine translation, summarization, paraphrasing, sentiment analysis, text classification, keyword extraction, automatic speech recognition, named entity recognition, paraphrase detection, part of speech tagging, and text difficulty classification, among others.

As used herein, the term "neural network" refers to a set of software instructions which comprise a machine learning model. The machine learning model includes a collection of interconnected neurons which can both receive inputs from and transmit outputs to other neurons and be trained via machine learning algorithms and deep learning methods to accomplish certain high-level tasks, like generation and classification, among other tasks. The term "neural networks" can include feedforward networks, recurrent neutral networks, bi-directional neural networks, convolutional neural networks, long-short-term memory (LSTM) networks, and bi-directional LSTMs (BiLSTM), among other variations.

As used herein, the term "generative adversarial network" or "GAN" refers to a set of software instructions which comprise a machine learning model, in particular, two or more neural networks which are adversarially trained. In some embodiments, GANs can be trained in an unsupervised manner by allowing the one or more neural networks to train in a zero-sum game. A GAN may comprise a generator network and a discriminator network. The generator network is rewarded, through a machine learning training algorithm, for producing model output candidates that the discriminator cannot distinguish from ground-truth training data.

As used herein, the term "conditional generator" refers to a set of software instructions comprising a component of a generative adversarial network. Where a generator may model candidate values by sampling random data, in some embodiments, a conditional generator may model candidate values given some additional information. For example, a conditional generator may generate candidate values given labeled ground-truth training data as input.

As used herein, the term "transformer" refers to a set of software instructions comprising a neural network. In some embodiments, a transformer includes a component that includes a self-attention mechanism. In some examples, the self-attention mechanism provides contextual information about portions of the machine learning model to other portions of the model during training. A transformer may include an encoder component. In some embodiments, an encoder may process a set of input vectors representing a sequence. A transformer may include a decoder component. In some embodiments, a decoder may receive input from an encoder and process the input to produce an output sequence.

FIG. 1 is a diagram of an example of a scanpath generation model training system 100, according to some embodiments described herein. Generally, the scanpath generation model training system 100 facilitates creation of a scanpath generation model 110 for use in various applications including, for instance, improving NLP models and saliency prediction. The scanpath generation model training system 100 may include a training module 102 which implements a generative adversarial network (GAN) 104 to train the scanpath generation model 110. The components of the training module 102 depicted in FIG. 1 and described herein may be implemented in software executed by one or more processing units of a computing system, implemented in hardware, or implemented as a combination of software and hardware. The GAN 104 may comprise two competing neural networks: a conditional generator 108 and a discriminator 112. The conditional generator 108 and the discriminator 112 may be adversarially trained to generate the scanpath generation model 110. During training, the discriminator 112 may receive a text input 120 and either a generated scanpath 116 or a recorded scanpath 118 associated with the text input 120. The text input 120 and associated recorded scanpath 118 are included in the training data 106. The training module 102 may select a generated scanpath 116 or a recorded scanpath 118 randomly during training or according to another suitable training procedure. The discriminator 112 may generate a classification 114 of whether the given scanpath is recorded or generated, according to a probability calculated by the discriminator 112. The accuracy of the classification 114 may be used to train both the discriminator 112 and the conditional generator 108 according to one or more loss functions using one or more feedback mechanisms.

Figure 2:
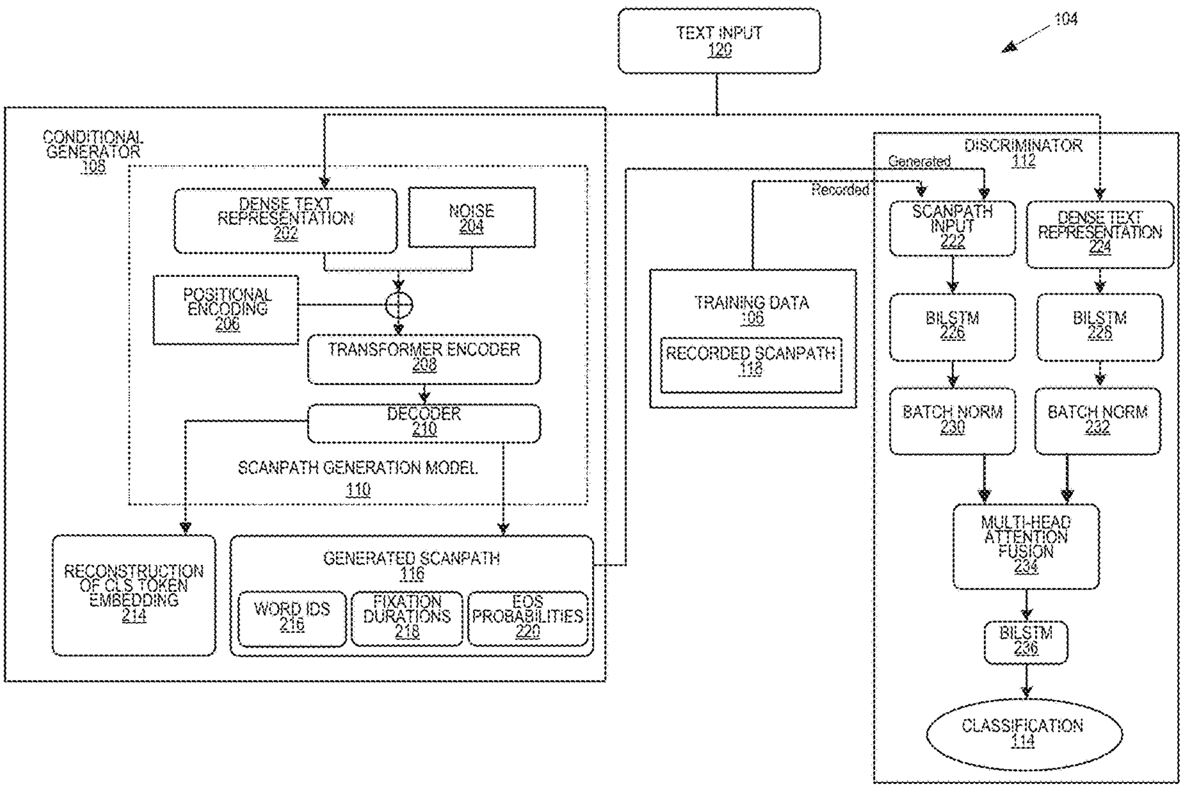
FIG. 2 is a diagram of an example of a training module including a generative adversarial network, which is executed as part of a scanpath generation model training system, according to some embodiments described herein

FIG. 2 is a diagram of an example of a training module 102 including a GAN 104, which is executed as part of a scanpath generation model training system 100, according to some embodiments described herein. The components of the training module 102 depicted in FIG. 2 and described herein may be implemented in software executed by one or more processing units of a computing system, implemented in hardware, or implemented as a combination of software and hardware. The GAN 104 can be trained using training data 106. The training data 106 may include one or more text inputs. The training data 106 may also consist of recorded scanpaths representing ground truth eye tracking recordings made of humans reading the text inputs. The training data may be used as input to both the conditional generator 108 and the discriminator 112. The recorded scanpaths and corresponding text inputs may include data obtained from a publicly available eye tracking corpus, for instance, the Corpus of Eye Movements in L1 and L2 English Reading (CELER) dataset. The CELER dataset comprises eye tracking data from 365 participants reading approximately 28.5 thousand sentences with a maximum length of one hundred characters.

The training data 106 may be processed prior to training, for example, to ensure that the scanpath generation model 110 is not unduly affected by outlier data points. For example, fixation durations in a recorded scanpath 118 above a certain threshold can be considered outliers and removed from the training data 106. In some embodiments, fixation durations above the ninety-ninth percentile of all fixation durations are removed from the training data 106. Likewise, recorded scanpath length above a certain threshold can be trimmed, both to eliminate outliers and to ensure that each text input 120 string each contains the same number of fixation points (e.g., words) so that the input to the language encoding neural networks used in the conditional generator 108 and the discriminator 112 have uniform dimension, as discussed below. In some embodiments, the maximum recorded scanpath length can be set to the ninety-ninth percentile, which corresponds to 80 fixation points (words). A recorded scanpath 118 shorter than the maximum scanpath length may be padded and a recorded scanpath 118 longer than the maximum scanpath length may be trimmed.

Both the conditional generator 108 and the discriminator 112 may receive a text input 120 associated with a recorded scanpath 118 or as a prompt for generating a generated scanpath 116. The text input 120 may be converted into dense text representations 202, 224, or embedded representations, using a pre-trained language encoding neural network. The dense text representation 202 along with the text input 120 may be used for conditioning the conditional generator 108. The conditional generator 108 is conditional in the sense that its output is conditional on labeled input, in contrast to random noise, which may be input to a conventional generator. For instance, the dense text representations 202, 224 may be generated using a pre-trained language encoding neural network such as a Bidirectional Encoder Representations from Transformers (BERT) model (not shown in the figure). The BERT model can receive a text input 120 which comprises one or two sentences. The BERT model may tokenize the text input 120 into a plurality of tokens. Some tokens may be portions of words or individual characters comprising words of the text input 120. The tokenized text input may include a classification (CLS) token and a separation (SEP) token. The CLS token may be appended to the beginning of the token sequence. The SEP token may be placed at the end of the first and/or second sentence of the text input 120. In an example, the BERT model then encodes each word in the text input 120 into at least one 768-dimensional vector. The encoding also includes a 768-dimensional CLS vector, derived from the CLS token, which may be used as input for classification tasks. The encoding may also contain one or two 768-dimensional SEP vectors, derived from the SEP tokens, which may be used for predicting the end of the first or second sentence or the beginning of the second sentence. The result of providing a text input 120 to the BERT model is thus a plurality of 768-dimensional vectors encoding the text input 120 which may be used as a dense, embedded input to a neural network. As discussed above, the expected length of the text input 120 is 80 words, which may include one or more padding tokens and the CLS and SEP tokens. Therefore, in some embodiments, the output of the BERT model is an 80×768-dimensional tensor.

The dense text representation 202 of the text input 120 may be concatenated with random noise 204. The random noise 204 may be sampled from a Gaussian noise distribution, but other distributions are possible. The dense text representation 202 of the text input 120 may be concatenated with random noise 204 to ensure that the output of the conditional generator 108 output is non-deterministic. In some examples, random noise 204 is concatenated with the dense text representation 202 of the text input 120 to account for the fact that different individuals may read a given text input 120 in different ways.

In addition to encoding the text input 120 as a dense text representation 202, positional encoding 206 may be added to the dense text representation 202 so that the relative position of each word, or the distance between different words in the text input 120, is encoded in the data used to train the conditional generator 108. Sinusoidal positional encoding 206 may be applied over the dense text representation 202 that are provided to the conditional generator 108. Other positional encoding 206 schemes may be used.

The conditional generator 108 may comprise a transformer network which itself comprises an encoder 208 and decoder 210. However, embodiments are not limited to transformer configurations. Other types of encoder/decoder frameworks could be used. The encoder 208 may receive the dense text representation 202 of the text input 120 combined with the positional encoding 206. The encoder 208 may comprise one or more layers, each layer comprising a self-attention layer and a feed forward layer. The self-attention layer may contain one or more heads. Multiple heads in the self-attention layer allows the attention mechanism to model different portions of the text input in parallel. Through a self-attention mechanism, each encoder layer generates encodings that contain information about which parts of the text input 120 are relevant to each other. The encoder 208 may have any number of layers and must have a hidden dimension of at least 768 dimensions, conforming to the cardinality of the input embedded vector. The minimum hidden dimension size may be any integer divisible by the number of attention heads. In some embodiments, a 3-layer encoder with four attention heads and a hidden dimension size of 776 followed by a feed-forward network is used, but other configurations are possible. The hidden dimension size of 776 corresponds to the dimension of the concatenation of the 768 dimensions of the BERT-encoded vector and the random noise 204.

The decoder 210 may receive the output of the encoder 208. The decoder 210 may comprise one or more task-specific feed-forward neural networks. The decoder 210 may use contextual information incorporated by the encoder 208 to generate an output sequence. In some embodiments, the output sequence may be a generated scanpath 116. In other embodiments, the output sequence may be a 768-dimensional reconstruction of the CLS token embedding 214 of the text input 120. The CLS token embedding may correspond to a global representation of the text input 120. In certain embodiments, the reconstruction of the CLS token embedding 214 may be adopted as an auxiliary task in order to boost model performance.

The conditional generator 108 may be a multi-task network with at least two tasks. The first task may include one branch of the task-specific feed-forward networks generating a generated scanpath 116. In a pre-trained scanpath generation model 110, this task may be used to generate scanpaths. The generated scanpath 116 can be output as a temporal sequence of word IDs 216, fixation durations 218, and end-of-sequence (EOS) probabilities 220. The second task may include a second branch of the task-specific feed-forward networks, which may include generating a 768-dimensional reconstruction of the CLS token embedding 214 of the text input 120. Both tasks have associated loss functions that are input to the overall GAN 104 loss function, as discussed in detail below.

The discriminator 112 may comprise one or more neural networks. The goal of the discriminator 112 is to distinguish between recorded and generated scanpaths. The outcome of that classification 114 can be used to train both the discriminator 112 itself and the GAN 104 as a whole, by propagating feedback through both the discriminator 112 and the conditional generator 108.

During training, the discriminator 112 may receive a text input 120 associated with a recorded scanpath 118 or a generated scanpath 116. The associated recorded scanpath 118 or a generated scanpath 116 may be offered to the discriminator 112 as a scanpath input 222. The text input 120 can be converted into a dense text representation 224 using a pre-trained language encoding neural network. For instance, the pre-trained language encoding neural network may include a BERT model, as described above. As with the conditional generator 108, the result of providing a text input 120 to the BERT model is thus a plurality of 768-dimensional vectors encoding the text input 120 which may be used as a dense, embedded input to a neural network.

The discriminator 112 may comprise two branches of Bi-directional Long Short-Term Memory (BiLSTM) neural networks 226, 228 that perform sequential modeling over the scanpath input 222 and text input 120 embeddings. The BiLSTMs 226, 228 may be followed by normalization layers 230, 232 for faster model convergence. For instance, in some embodiments, the Batch Norm algorithm may be implemented in normalization layers 230, 232. In some examples, the BiLSTMs 226, 228 can have a hidden size of 64 and a dropout ratio of 0.3, but other configurations are possible. During training, the first branch may receive a scanpath input 222 comprising either a recorded scanpath 118 from the training data 106 or a generated scanpath 116 from the conditional generator 108. The second branch may receive the text input 120 associated with the scanpath input 222 received by the first branch. The outputs of the two branches can be combined and passed to a multi-headed attention fusion network 234, followed by a BiLSTM 236. In some embodiments, the multi-headed attention fusion network 234 may have 4 heads, but other configurations are possible. The hidden states of the last layer of the BiLSTM 236 from both forward and backward directions may be concatenated and supplied to a feed-forward network. The output of the feed-forward network may be activated by the Sigmoid function (not shown), resulting in a probability that can be used for classification. In this example, the probability may be used to determine whether the scanpath input 222 received by the first branch was a recorded scanpath 118 or a generated scanpath 116. This classification by the discriminator 112 may be used to train both the discriminator 112 itself and the GAN 104 as a whole, by propagating feedback through both the discriminator 112 and the conditional generator 108.

Figure 3:
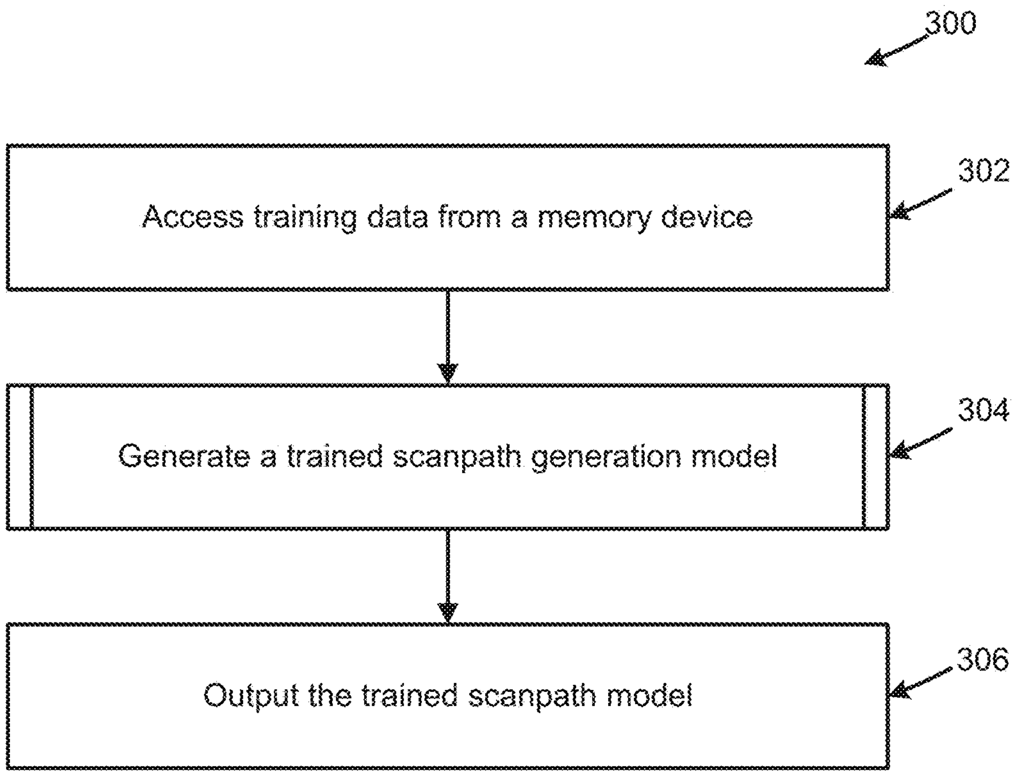
FIG. 3 is a flow diagram of an example of a process for training a scanpath generation model.

FIG. 3 is a flow diagram of an example of a process 300 for training a scanpath generation model. The process 300 depicted in FIG. 3 may be implemented in software executed by one or more processing units of a computing system, implemented in hardware, or implemented as a combination of software and hardware. This process 300 is intended to be illustrative and non-limiting. The example process herein is described with reference to the scanpath generation model training system 100 and GAN 104 depicted in FIGS. 1 and 2, but other implementations are possible. Although FIG. 3 depicts various processing operations occurring in a particular order, the particular order depicted is not required. In certain alternative embodiments, the processing may be performed in a different order, some operations may be performed in parallel, or operations may be added, removed, or combined together. In some embodiments, this process 300 or similar is performed by the scanpath generation model training system 100 and is facilitated by the training module 102.

In block 302, the training module 102 accesses training data 106 from a memory device. The memory device could be a local storage device included in or accessible to the scanpath generation model training system 100 or from an external source, such as a cloud storage provider or other network location. The training data 106 includes a plurality of text inputs and a recorded scanpath 118 for each text input 120. These recorded scanpaths are the ground-truth training data used for building the scanpath generation model 110. The recorded scanpaths may be obtained from a publicly available eye tracking corpus including, for instance, the Corpus of Eye Movements in L1 and L2 English Reading (*CELER*) dataset.

In block 304, the training module 102, comprising a GAN 104, generates a trained scanpath generation model 110 through adversarial training. Block 304 will be discussed in detail in FIG. 4.

In block 306, the trained scanpath generation model 110 is output. For instance, the trained scanpath generation model 110 can be used as input to improve or augment NLP modeling or to implement a saliency prediction system. The trained scanpath generation model 110 may be a trained neural network but may also be the set of parameters defining a model developed by training a neural network, implemented separately. In the example GAN 104 depicted in FIG. 2, the scanpath generation model 110 may be one of the two tasks performed by the task-specific feed-forward networks of the decoder 210. In other words, the trained scanpath generation model 110 may consist of the parameters, weights, hyperparameters, etc. defining certain components of the conditional generator 108 including at least the dense text representation 202, encoder 208, and decoder 210. These components may be used, along with the parameters, weights, hyperparameters, etc. obtained from the trained scanpath generation model 110, as a standalone scanpath generator to be used as input to various applications.

In some examples, the training data 106 may further comprise feedback from one or more client devices that utilize the trained scanpath generation model 110. For example, a client device may include an application that displays generated scanpaths for saliency analysis or incorporates generated scanpaths into an NLP model. The client device may receive user feedback or automated, algorithmic feedback based on the scanpaths generated by the scanpath generation model 110 included in the client device. The training module 102 may receive feedback from the client device and further train the scanpath generation model 110 based on the feedback from the client device. The further training may be offline or online training. Offline training may include training with a static training data 106 set. For example, the feedback may be added to the training data 106. Online training may include training of a machine learning model that occurs while the model is in use, such that the model is constantly updated. For example, the feedback may be used to improve the performance of a trained scanpath generation model 110 while the model is in use. Further training of the scanpath generation model 110 may include additional components. For example, one or more additional neural networks may be used in training module 102 to incorporate the feedback.

In some examples, the algorithmic feedback may be used to implement intent-aware scanpath generation. For example, the performance of an NLP model with generated scanpath data incorporated may be determined. The performance can be used to determine a gradient that can be fed back to the conditional generator 108. Conditioning scanpath generation on NLP tasks may bias the conditional generator 108 towards words that are relevant for the particular NLP task and could therefore boost the performance of the downstream NLP task.

Figure 4:
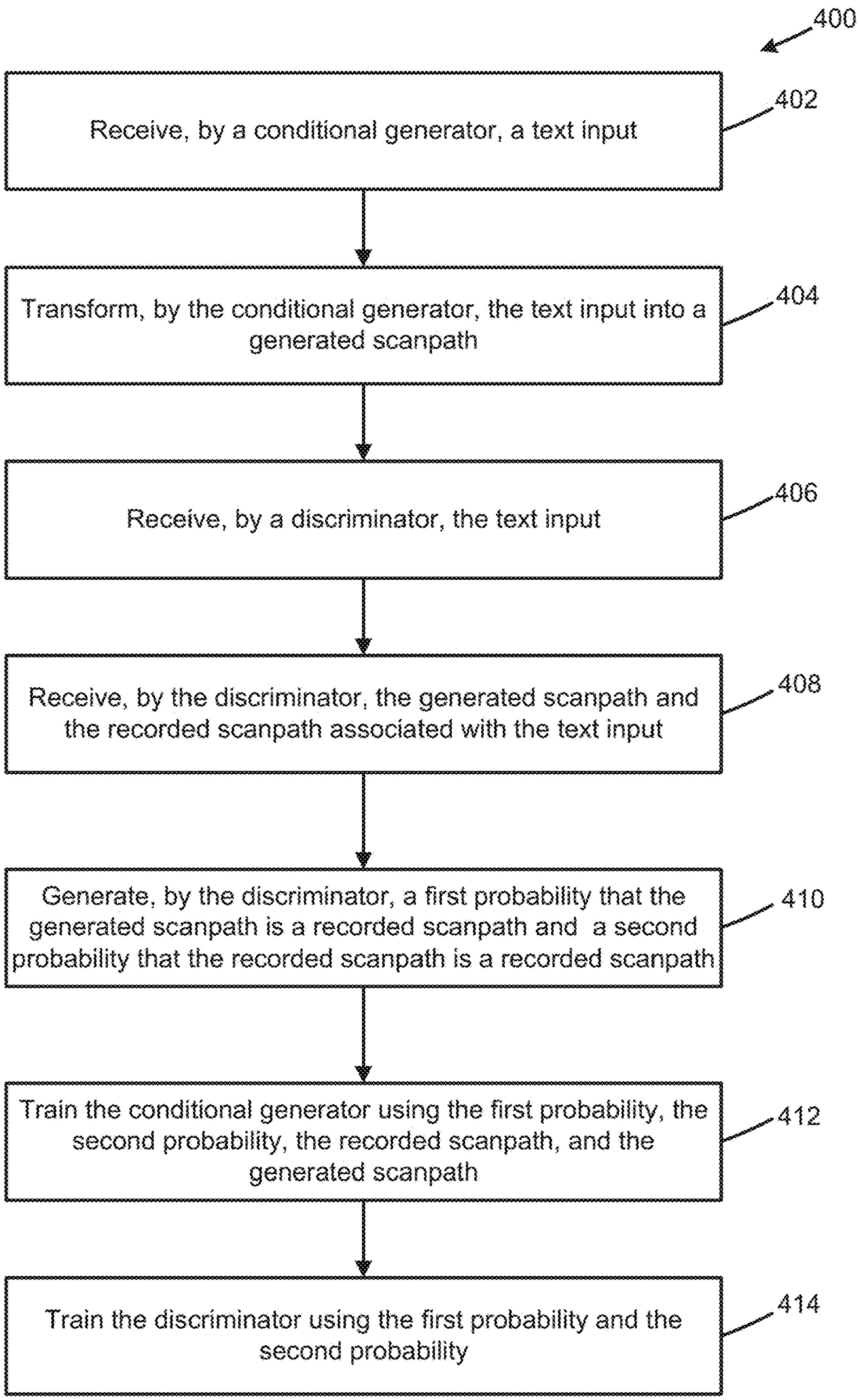
FIG. 4 is a flow diagram of an example of a process for generating a trained scanpath generation model as part of the process depicted in FIG. 3.

FIG. 4 is a flow diagram of an example of a process 400 for generating a trained scanpath generation model 110 as depicted in block 304 of FIG. 3. The process 400 depicted in FIG. 4 may be implemented in software executed by one or more processing units of a computing system, implemented in hardware, or implemented as a combination of software and hardware. This process 400 is intended to be illustrative and non-limiting. The example process herein is described with reference to the scanpath generation model training system 100 and GAN 104 depicted in FIGS. 1 and 2, but other implementations are possible. In some embodiments, this process 400 or similar is performed by the scanpath generation model training system 100 and is facilitated by the training module 102.

In block 402, a conditional generator 108 receives a text input 120. In some embodiments, the text input 120 is an element of the training data 106. However, if the conditional generator 108 is already trained, it may receive arbitrary text inputs, in order to generate scanpaths. The conditional generator 108 may encode the text input 120 into to a dense text representation 202. For instance, a pre-trained language encoding neural network such as a BERT model may be used to encode the input text 120. The dense text representation 202 may be concatenated with random noise 204 to ensure non-deterministic behavior of the conditional generator. In some examples, the random noise 204 may be sampled from Gaussian noise, but other distributions may be used. The framework may include the addition of positional encoding 206 to the dense text representation 202. In some embodiments, the length of the text input 120 is limited according to the constraints of the dense text representation 202 used by the conditional generator 108, as discussed above.

Figure 5:
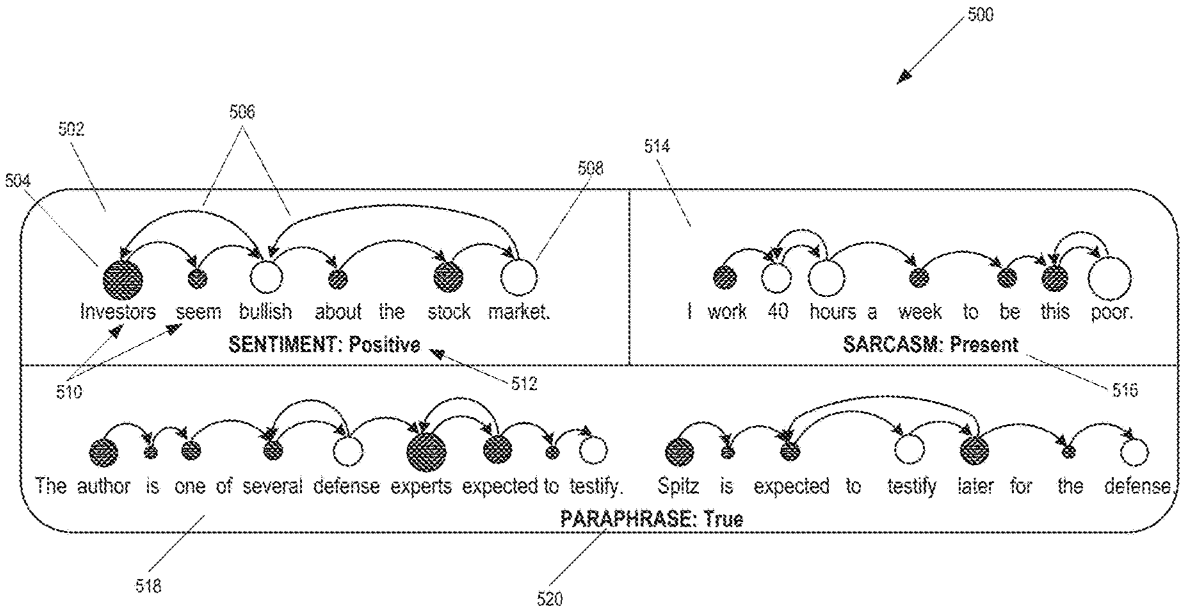
FIG. 5 is an illustration of several example generated scanpaths generated by a scanpath generation module, facilitated by a training module, according to some embodiments described herein.

In block 404, the text input is transformed by the conditional generator 108 into a generated scanpath 116. The transformation may be realized by a transformer-based encoder-decoder framework. The conditional generator 108 may be a multi-task network with at least two tasks. The first task may include generation of a generated scanpath 116. This task is the source of the trained scanpath generation model 110, once the scanpath generation model 110 has been adversarially trained. The generated scanpath 116 is output as a temporal sequence of word IDs 216, fixation durations 218, and EOS probabilities 220. A visualization of a generated scanpath 116 is depicted in FIG. 5. The second task may include a 768-dimensional reconstruction of the CLS token embedding 214 of the text input 120. Both tasks have associated loss functions that are input to the overall GAN 104 loss function.

Training of the scanpath generation task tries to minimize the deviation of the generated scanpath 116 from the ground-truth recorded scanpath 118 for a given text input 120. This deviation over a text input of k words for a recorded scanpath r and a generated scanpath g is measured using the generated scanpath loss function $\mathbb{L}_s$:

$$\mathbb{L}_s(\mathcal{G}(\mathcal{T},\mathcal{N}),\mathcal{R}(\mathcal{T},h)) = \frac{1}{k}\sum_{i=0}^{k}\left(\alpha\left(id_g^i - id_r^i\right)^2 + \beta\left(t_g^i - t_r^i\right)^2 + \gamma\left(E_g^i - E_r^i\right)^2\right)$$

The above equation captures the deviation $\mathbb{L}_s$ between generated scanpaths $\mathcal{G}(\mathcal{T},\mathcal{N})$ and recorded scanpaths $\mathcal{R}(\mathcal{T}, h)$ included in training data 106. $\mathcal{G}(\mathcal{T},\mathcal{N})$ corresponds to generated scanpaths which are a function of text T concatenated with Gaussian noise $\mathcal{N}$ N in order to ensure that the generator's output is non-deterministic. $\mathcal{R}(\mathcal{T}, h)$ indicates recorded scanpaths which are made by recording a human h reading text $\mathcal{T}$. The first term measures the error between real and predicted fixation points (words) given by the mean squared difference between the generated and recorded word positions. In other words, this term captures the difference in position of the word ordering between each generated scanpath 116 and recorded scanpath 118 pair. For instance, if the text input 120 is "have a nice day," the recorded scanpath 118 might contain the sequence {"have", "a", "nice", "day" } where the generated scanpath 116 results in the sequence {"a", "nice", "have", "day" }. In this example, the difference in position for the word "have" is 2, resulting in a mean squared error of 4 for that term. The second term measures the mean squared difference between generated fixation durations 218 and recorded fixation durations. The fixation durations 218 correspond to the amount of time the human eye rests (or is predicted to rest) on a given word. Finally, the third term measures the between the mean squared difference between the generated end-of-sequence (EOS) probabilities 220 and recorded EOS probabilities. The EOS probabilities 220 correspond to the probability that the associated word IDs 216 are the end of the temporal scanpath sequence. The EOS probabilities 220 may be used to determine the length of the generated scanpath. For instance, an EOS probability above a pre-set threshold can be used to estimate the length of a given generated scanpath. These three terms are weighted by hyperparameters α, β, and γ. The hyperparameters can be tuned during training to optimize the learning process.

The reconstruction of the CLS token embedding 214 task may also be used to train the GAN 104. Because scanpaths depend heavily on the linguistic properties of the text input 120, a reconstruction loss may be used to guide the conditional generator towards probable data manifolds. Reconstruction loss measures the mean-squared error between the reconstruction of the CLS token embedding 214 and the actual BERT-encoded CLS token of the input text 120 encoded by the dense text representation 202. In some examples, the reconstruction of the CLS token embedding 214 task represents how well the conditional generator 108 models the text input 120. Training of the reconstruction of the CLS token embedding 214 task tries to minimize the reconstruction loss $\mathbb{L}_r$, given by:

$$\mathbb{L}_r(\mathcal{G}(\mathcal{T},\mathcal{N}),\mathcal{R}(\mathcal{T},h)) = (BERT(w_a^r, w_b^r, \ldots w_n^r) - BERT(w_a^g, w_b^g, \ldots w_n^g))^2$$

The above equation captures the deviation $\mathbb{L}_r$ between the reconstructed CLS vector representations of the generated scanpaths $\mathcal{G}(\mathcal{T},\mathcal{N})$ and recorded scanpaths $\mathcal{R}(\mathcal{T},h)$, as defined previously.

$$BERT(w_a^r, w_b^r, \ldots w_n^r)$$

corresponds to the CLS vector representation of the recorded scanpaths.

$$BERT(w_a^g, w_b^g, \ldots w_n^g)$$

corresponds to the CLS vector representation of the generated scanpaths. Minimization of this loss function improves model performance as observed empirically.

In block 406, the discriminator 112 receives the text input 120. The discriminator 112 may encode the text input 120 into to a dense text representation 224. For instance, a pre-trained language encoding neural network such as a BERT model may be used to encode the input text 120. In some embodiments, the length of the text input 120 is limited according to the constraints of the dense text representation 202 used by the conditional generator 108, as discussed above.

In block 408, the discriminator 112 may receive the generated scanpath 116 generated in block 404. Alternatively, the discriminator 112 may receive the recorded scanpath 118 associated with the text input 120. The training module 102 may select a generated scanpath 116 or a recorded scanpath 118 randomly during training or according to another suitable training algorithm.

In block 410, the discriminator 112 generates a first probability that the generated scanpath 116 is a recorded scanpath 118. The discriminator 112 generates a second probability that the recorded scanpath 118 is a recorded scanpath 118. In other words, the discriminator 112 generates the probability that the scanpath received, whether generated or recorded, is recorded. The probability may be used to make a classification 114 as to whether the scanpath received was a generated scanpath 116 or a recorded scanpath 118. In some examples, the classification 114 may include a classification threshold, above which the scanpath is classified as a recorded scanpath 118 or below which the scanpath is classified as a generated scanpath 116. The classification threshold may be a hyperparameter that can be adjusted during training.

Training of the GAN 104 may include both training of the conditional generator 108 and training of the discriminator 112. In block 412, the conditional generator 108 is adversarially trained using the first probability, the second probability, the recorded scanpath 118, and the generated scanpath 116. In block 414, the discriminator 112 is adversarially trained using the first probability and the second probability.

In blocks 412 and 414, the GAN 104 may be adversarially trained using the classification 114 of the discriminator 112 of whether the input scanpath was a recorded scanpath 118 or a generated scanpath 116. The classification 114 of the discriminator 112 may be used to train both the discriminator 112 and the conditional generator 108. The discriminator 112 is penalized for incorrect determinations and the conditional generator 108 is rewarded for generating a generated scanpath 116 that the discriminator 112 cannot correctly distinguish from the recorded scanpath 118. Thus, in a zero-sum fashion, the conditional generator 108 and the discriminator 112 are adversarially trained together to train the scanpath generation model 110. The overall loss function for the GAN 104 is given by the "minimax" adversarial loss $\mathbb{L}_a$:

$$\mathbb{L}_a = \min_G \max_D \mathbb{E}_{x\sim p_{data}(x)}[\log D(x \mid \mathcal{T}, h)] + \mathbb{E}_{z\sim p_z(z)}[1 - \log D(G(z \mid \mathcal{T}, \mathcal{N}))]$$

This equation illustrates the algorithm used during adversarial training. During adversarial training, training of the discriminator, D, operates to maximize the loss function, while training the generator, G, operates to minimize the loss function. In this equation, x represents recorded scanpath data, where z represents generated scanpath data. $D(x|\mathcal{T})$ stands for the estimate, by the discriminator 112, of the probability that a given recorded scanpath x is a recorded scanpath 118, given text input $\mathcal{T}$. $\mathbb{E}_{x\sim p_{data}(x)}$ stands for the expected value of the log(D) term over the set of all recorded scanpaths. $G(z|\mathcal{T}, \mathcal{N})$ represents the output of the conditional generator 108, a generated scanpath 116, given text input $\mathcal{T}$ concatenated with Gaussian noise $\mathcal{N}$. $D(G(z|\mathcal{T}, \mathcal{N}))$ stands for the estimate, by the discriminator 112, of the probability that a given generated scanpath 116 is a recorded scanpath 118. $\mathbb{E}_{z\sim p_z(z)}$ stands for the expected value of the 1-log(D(G)) term over all the set of all generated scanpaths. The conditional generator 108 cannot directly affect the log(D) term since it comprises only recorded scanpaths and the discriminator 112 output. Therefore, the conditional generator's loss function can be given by:

$$\mathbb{L}_g = \mathbb{L}_s + \mathbb{L}_r + \mathbb{E}_{z\sim p_z(z)}[1 - \log D(G(z \mid \mathcal{T}, \mathcal{N}))]$$

This equation combines the generated scanpath loss function $\mathbb{L}_s$ and the reconstruction loss $\mathbb{L}_r$ with the second term from the minimax adversarial loss $\mathbb{L}_a$ described above, to yield the conditional generator loss $\mathbb{L}_g$.

In some examples, conditional generator 108 and discriminator 112 losses are minimized using the Adaptive Moment Estimation (Adam) and Root Mean Square Propagation (RMSProp) optimization algorithms, but other algorithms may be used as well. In some examples, hyperparameters may include a batch size of 128, a learning rate for the conditional generator 108 of 0.0001, a learning rate for the discriminator 112 of 0.00001, but hyperparameters can vary from one embodiment to the next. In some examples, the model is trained over 300 epochs, but this value is meant to be non-limiting.

FIG. 5 is an illustration 500 of several example generated scanpaths 502, 514, 518 generated by a scanpath generation model 110, facilitated by a training module 102, according to some embodiments described herein. In the first example, a generated scanpath 502 is provided to an NLP model for sentiment analysis. The generated scanpath 502 comprises zero or more words 510, which comprise the text input 120. The number of words 510 in the generated scanpath 502 may be less than, equal to, or greater than the number of words in the text input 120. This is because a reader may skip over some words and/or repeat some words while reading. The order of the words 510 indicates the ordering of the text input 120. The arrows 506 indicate the ordering of the generated scanpath 502. Arrows 506 can move both forward and backwards through the words 510 of the text input 120, illustrating that the ordering of the generated scanpath 502 is not always in the same order as the words 510 comprising the text input 120 and that words may repeat. The size of the circles 504, 508 above the words comprising the text input 120 indicate the magnitude of the fixation duration. A larger circle corresponds to a longer fixation duration. The shading of the circles indicates the relative importance of the word, as determined by an NLP model. Shaded circles 504, indicating a relatively more important word, may have a higher fixation duration and may be revisited more than other words in the text. In contrast, an unshaded circle 508 may indicate a word of lower importance. The result 512 indicates the output of the sentiment analysis from the NLP model.

Two additional examples of generated scanpaths 514, 518 and NLP models are given. In the second example generated scanpath 514, the NLP model is trained for sarcasm detection. The result 516 indicates the output of the sarcasm detection from the NLP model. In the third example generated scanpath 518, the NLP model is trained to paraphrase the text input 120. The result 520 indicates the output of paraphrasing the text input 120 by the NLP model. In all three examples, the example generated scanpaths 502, 514, 518 may be used to augment the training data provided to NLP models during training.

Figure 6A:
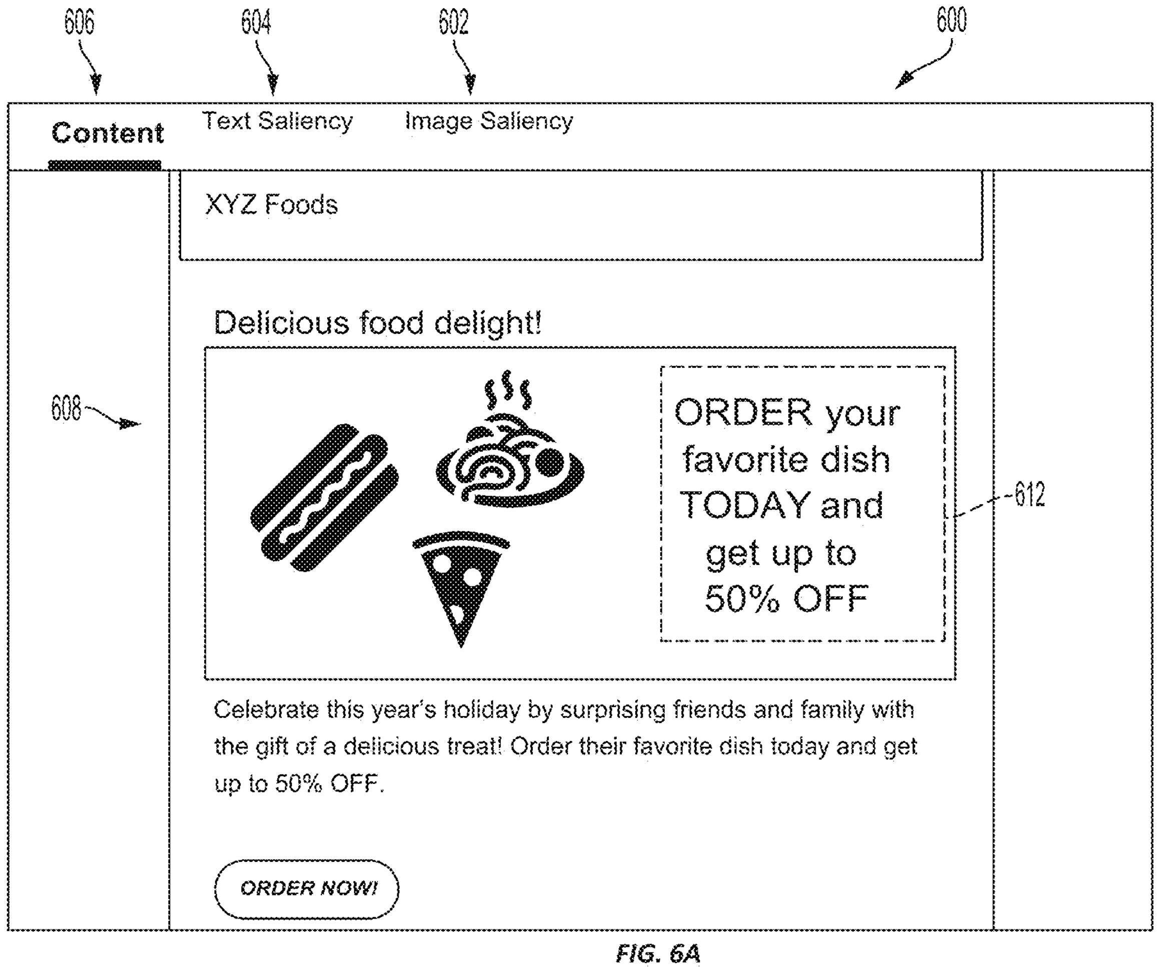
FIGS. 6A-C are illustrations of an example application utilizing a trained scanpath generation model, according to some embodiments described herein.
Figure 6B:
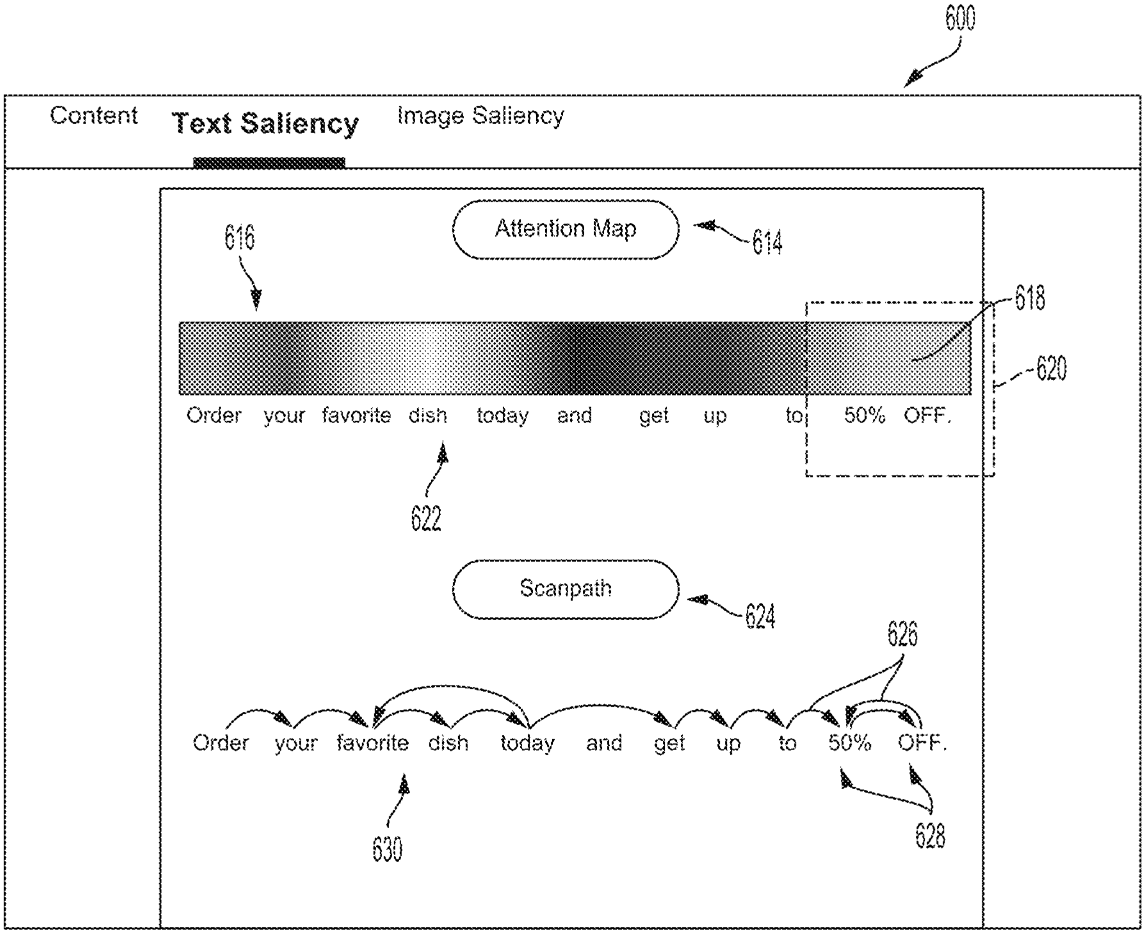
Figure 6C:
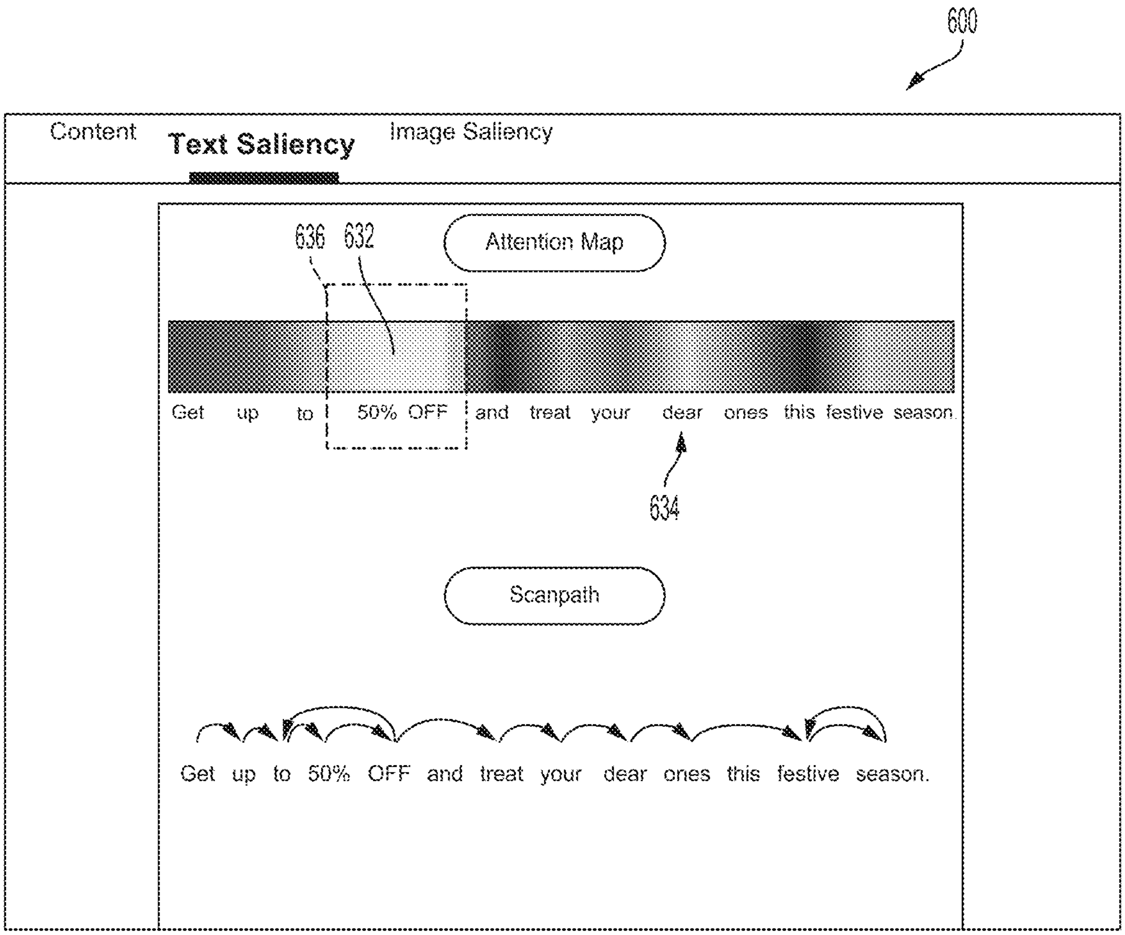

FIGS. 6A-C are illustrations of an example application 600 utilizing a trained scanpath generation model 110, according to some embodiments described herein. In FIG. 6A, an example user interface from an example application 600 utilizing a trained scanpath generation model 110 is shown. In this example, the application 600 is configured for saliency analysis, but other possible applications are possible. For instance, another example application may implement an NLP model. Some examples may be included in a journey optimizer. A journey optimizer may include program code to develop narrative or marketing content.

The application 600 allows for selection of a mode. In the content mode 606, a document 608 containing images and words may be identified by the user and displayed. The example application 600 can perform one or more analyses on the images and texts, which may include image saliency analysis and text saliency analysis. Image saliency analysis may be performed in the image saliency analysis mode 602. The text saliency analysis mode 604 is discussed below. In the content mode 606, the user may identify a portion of the text for text saliency analysis using a content optimizer window 612. In some examples, the application 600 may perform text saliency analysis on all text present in the document 608.

In FIG. 6B, the result of text saliency analysis performed using a trained scanpath generation model 110 in an example application 600 is shown. In some examples, text saliency analysis mode 604 corresponds to a content optimizer window 612. The generated scanpath 630 is displayed. The application 600 may include a label 624 indicating the presence of the generated scanpath 630. The words 628 and arrows 626 have a similar meaning to the arrows 506 and words 510 discussed in FIG. 5. The order of the words 628 indicates the ordering of the text input, in this case the portion of the text identified for text saliency analysis using the content optimizer window 612. The arrows 626 indicate the ordering of the generated scanpath 630. An attention map 616 may be displayed, which provides a visual presentation of the generated scanpath 630. The application 600 may include a label 614 indicating the presence of the attention map 616. In the attention map 616, lighter areas 618 correspond to longer fixation durations 218 associated with the words 622 of the generated scanpath 630. In some text saliency analyses, the objective may be to optimize fixation duration on certain portions of the text selected using the content optimizer window 612. For example, in content containing a numerical discount, the user may wish to optimize the fixation duration on the numerical discount. In some examples, a portion 620 of the attention map 616 may be highlighted.

In FIG. 6C., the result of text saliency analysis performed using a trained scanpath generation model 110 by an example application 600 is shown. In this example, the attention map 616 in FIG. 6B has been used to reconfigure the text input, the portion of the text identified for text saliency analysis using the content optimizer window 612, to optimize fixation duration in the vicinity of the highlighted portion 636 of the attention map 616. The lightest area 632 of the resultant attention map 616 corresponds to an optimal arrangement of words 634 in the text input 120. Other embodiments of this example application 600 may include a text saliency analysis mode 604 that suggests variations in the ordering of the text input 120 that correspond with optimal arrangement of words according to a trained scanpath generation model 110.

It should be stressed that this example application 600 is just one example of the various applications possible with a trained scanpath generation model 110 and is not in any way limiting. Other applications may use different user interfaces, including different visual presentations of the generated scanpaths. For instance, another example application may implement an NLP model.

Figure 7:
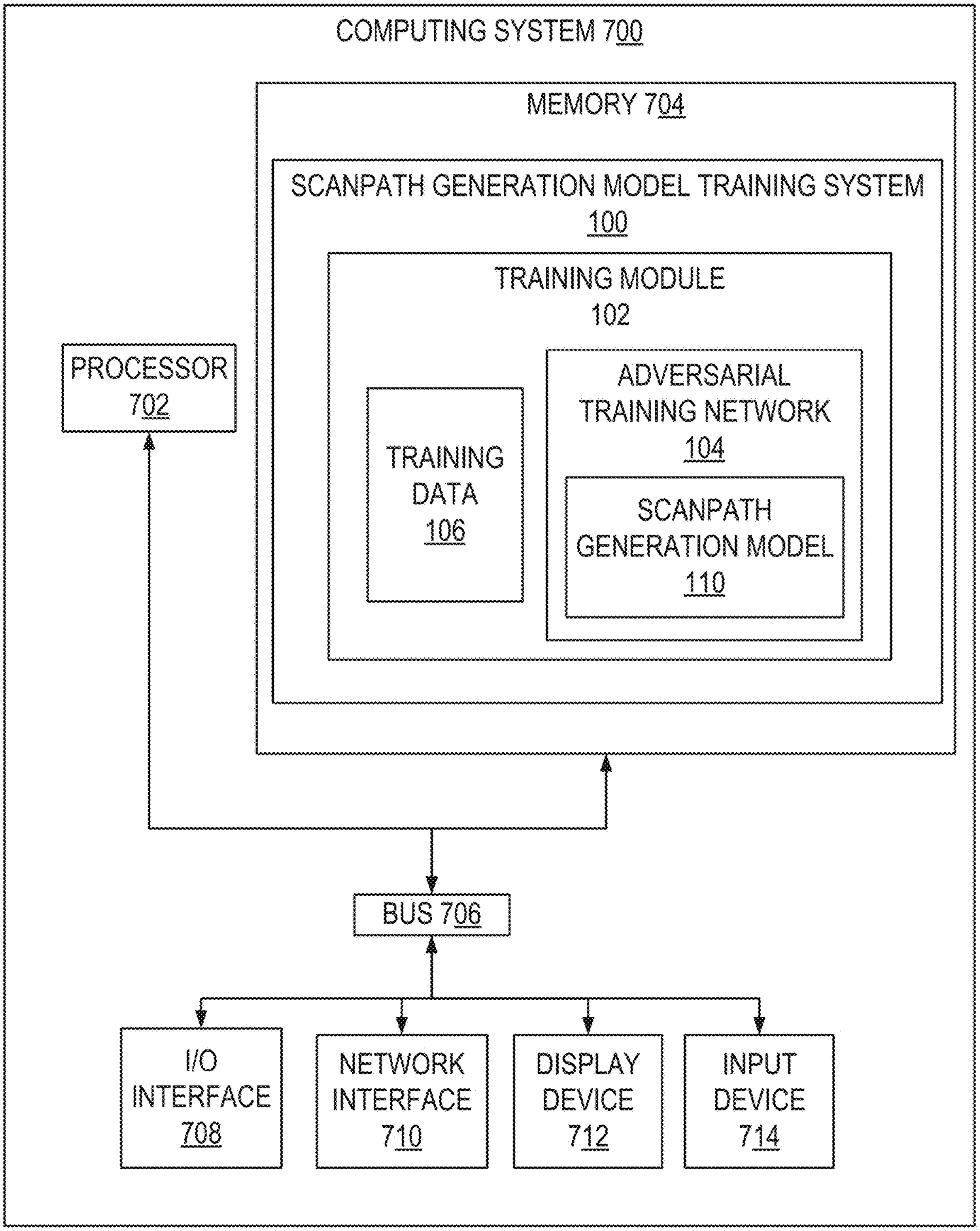
FIG. 7 is a diagram of an example of a computing system for performing certain operations described herein, according to some embodiments.

FIG. 7 is a diagram of an example of a computing system 700 for performing certain operations described herein, according to some embodiments. A suitable computing system or group of computing systems can be used for performing the operations described herein. For example, FIG. 7 depicts an example of a computing system 700 that can implement the training module 102, the scanpath generation model training system 100 for the training module 102, or various other components described herein. In some embodiments, the computing system 700 can implement the scanpath generation model training system 100, including the training module 102, and an additional computing system having devices similar to those depicted in FIG. 7 (e.g., a processor, a memory, etc.) may implement the trained scanpath generation model 110 in concert with various applications. Thus, the scanpath generation model training system 100 can train the scanpath generation model 110, and the parameters, weights, hyperparameters, etc. of the trained scanpath general model 110 along with one or more components of the conditional generator 108 may be used in the additional computing system for integration with various applications. In other embodiments, the computing system 700 implements both the scanpath generation model training system 100 and the trained scanpath general model 110.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses are also included in the computing system 700. The bus 706 communicatively couples one or more components of the computing system 700.

The computing system 700 executes program code that configures the processor 702 to perform one or more of the operations described herein. The program code may include, for example, the training module 102, the GAN 104, the scanpath generation model 110, other components of the scanpath generation model training system 100, or applications that perform one or more operations described herein. The program code may be resident in the memory device 704 or any suitable computer-readable medium and may be executed by the processor 702 or any other suitable processor.

The computing system 700 can access other models, datasets, or functions of the scanpath generation model training system 100 in any suitable manner. In some embodiments, some or all of one or more of these models, datasets, and functions are stored in the memory device 704 of a computing system 700, as in the example depicted in FIG. 7. In some embodiments, one or more components of the scanpath generation model training system 100 may be stored on a separate computing system, and the scanpath generation model training system 100 can provide access to necessary models, datasets, and functions as needed. For instance, the GAN 104 or some components thereof may be operated on a separate computing system. In additional or alternative embodiments, one or more models, datasets, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices via a data network using the network interface device 710.

The computing system 700 also includes a display device 712. The display device 712 includes any device or group of devices suitable for viewing a user interface while the scanpath generation model 110 is trained. Other aspects of the scanpath generation model training system 100 may also be displayed on the display device 712. Examples of the display device 712 include a computer monitor, a laptop screen, a tablet screen, or a smartphone screen.

The computing system 700 also includes an input device 714. The input device 714 includes any device or group of devices suitable for operation of the scanpath generation model training system 100 according to output from the display device 712. Examples of the input device 714 include a keyboard, mouse, tablet screen, or smartphone screen.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example and explanation rather than limitation, and does not preclude the inclusion of such modifications, variations, and/or additions to the present subject matter as would be readily apparent to one of ordinary skill in the art.

The invention claimed is:

1. A method, comprising:

accessing, by a training module from a memory device, training data, the training data comprising a text input, the training module comprising an adversarial training neural network configured to generate a scanpath generation model for generating scanpaths, wherein a scanpath comprises a sequence of words and a corresponding sequence of fixation durations, wherein the sequence of words comprises one or more words comprising the text input;

generating, by the training module, a trained scanpath generation model, comprising training, using the training data, by the adversarial training neural network, the scanpath generation model; and outputting, by the training module, the trained scanpath generation model, wherein the trained scanpath generation model is a standalone model operable independently of the adversarial training neural network to generate scanpaths from text inputs.

2. The method of claim 1, wherein the training data comprises a set of text inputs, the text inputs having an associated set of recorded scanpaths, the recorded scanpaths representing ground truth eye tracking recordings based on the set of text inputs.

3. The method of claim 1, wherein:

the training data comprises a set of text inputs, the set of text inputs having an associated set of recorded scanpaths; and generating, by the training module, the trained scanpath generation model further comprises:

receiving, by a conditional generator and from the training data, the text input;

transforming, by the conditional generator, the text input into a generated scanpath;

receiving, by a discriminator and from the training data, the text input;

receiving, by the discriminator, the generated scanpath associated with the text input and the recorded scanpath associated with the text input;

generating, by the discriminator, a first probability that the generated scanpath is a recorded scanpath and a second probability that the recorded scanpath is a recorded scanpath;

training the conditional generator using the first probability, the second probability, the recorded scanpath, and the generated scanpath; and training the discriminator using the first probability and the second probability.

4. The method of claim 3, wherein generating, by the training module, the trained scanpath generation model further comprises:

transforming, by a first pre-trained neural network, the text input into a first dense text representation;

conditioning the conditional generator based on the first dense text representation;

transforming, by a second pre-trained neural network, the text input into a second dense text representation; and conditioning the discriminator based on the second dense text representation.

5. The method of claim 4, wherein generating, by the training module, the trained scanpath generation model further comprises:

transforming, by the conditional generator, the first dense text representation into a reconstruction of the text input; and wherein training the conditional generator further comprises using the first dense text representation and the reconstruction of the text input.

6. The method of claim 1, further comprising:

augmenting one or more natural language processing ("NLP") models using the trained scanpath generation model, wherein the one or more NLP models comprise sentiment analysis, paraphrase detection, or sarcasm detection; and training the one or more NLP models using generated scanpaths generated by the trained scanpath generation model to improve performance of the one or more augmented NLP models.

7. The method of claim 3, further comprising:

augmenting one or more NLP models using the trained scanpath generation model, wherein the one or more NLP models comprise sentiment analysis, paraphrase detection, or sarcasm detection;

determining a gradient based on performance of the one or more augmented NLP models; and sending the gradient to the conditional generator to improve the performance of the one or more augmented NLP models.

8. The method of claim 1, wherein:

the training data further comprises feedback from one or more client devices, wherein the one or more client devices comprise the trained scanpath generation model; and the method further comprises outputting, by the training module, the scanpath generation model, wherein the trained scanpath generation model is further trained based on the feedback from one or more client devices.

9. A system comprising a training module, comprising:

a processing device; and a memory device that includes instructions executable by the processing device for causing the processing device to perform operations comprising:

accessing, by the training module from the memory device, training data, the training data comprising a text input, the training module comprising an adversarial training neural network configured to generate a scanpath generation model for generating scanpaths, wherein a scanpath comprises a sequence of words and a corresponding sequence of fixation durations, wherein the sequence of words comprises one or more words comprising the text input;

generating, by the training module, a trained scanpath generation model, comprising training, using the training data, by the adversarial training neural network, the scanpath generation model; and outputting, by the training module, the trained scanpath generation model, wherein the trained scanpath generation model is a standalone model operable independently of the adversarial training neural network to generate scanpaths from text inputs.

10. The system of claim 9, wherein:

the training data comprises a set of text inputs, the set of text inputs having an associated set of recorded scanpaths; and generating the trained scanpath generation model further comprises:

receiving, by a conditional generator and from the training data, the text input;

transforming, by the conditional generator, the text input into a generated scanpath;

receiving, by a discriminator and from the training data, the text input;

receiving, by the discriminator, the generated scanpath associated with the text input and the recorded scanpath associated with the text input;

generating, by the discriminator, a first probability that the generated scanpath is a recorded scanpath and a second probability that the recorded scanpath is a recorded scanpath;

training the conditional generator using the first probability, the second probability, the recorded scanpath, and the generated scanpath; and training the discriminator using the first probability and the second probability.

11. The system of claim 10, wherein generating the trained scanpath generation model further comprises:

transforming, by a first pre-trained neural network, the text input into a first dense text representation;

conditioning the conditional generator based on the first dense text representation;

transforming, by a second pre-trained neural network, the text input into a second dense text representation; and conditioning the discriminator based on the second dense text representation.

12. The system of claim 9, further comprising:

augmenting one or more natural language processing ("NLP") models using the trained scanpath generation model, wherein the one or more NLP models comprise sentiment analysis, paraphrase detection, or sarcasm detection; and training the one or more NLP models using generated scanpaths generated by the trained scanpath generation model to improve the performance of the one or more augmented NLP models.

13. The system of claim 10, further comprising:

augmenting one or more NLP models using the trained scanpath generation model, wherein the one or more NLP models comprise sentiment analysis, paraphrase detection, or sarcasm detection;

determining a gradient based on the performance of the one or more augmented NLP models; and sending the gradient to the conditional generator to improve the performance of the one or more augmented NLP models.

14. The system of claim 9, further comprising:

the training data further comprises feedback from one or more client devices, wherein the one or more client devices comprise the trained scanpath generation model; and the operations further comprise outputting the scanpath generation model, wherein the trained scanpath generation model is further trained based on the feedback from one or more client devices.

15. A non-transitory computer-readable medium comprising instructions that are executable by a processing device for causing the processing device to perform operations comprising:

accessing, by a training module, from a memory device, training data, the training data comprising a text input, the training module comprising an adversarial training neural network configured to generate a scanpath generation model for generating scanpaths, wherein a scanpath comprises a sequence of words and a corresponding sequence of fixation durations, wherein the sequence of words comprises one or more words comprising the text input;

generating, by the training module, a trained scanpath generation model, comprising training, using the training data, by the adversarial training neural network, the scanpath generation model; and outputting, by the training module, the trained scanpath generation model, wherein the trained scanpath generation model is a standalone model operable independently of the adversarial training neural network to generate scanpaths from text inputs.

16. The non-transitory computer-readable medium of claim 15, wherein:

the training data comprises a set of text inputs, the set of text inputs having an associated set of recorded scanpaths; and the operation to generate the trained scanpath generation model further comprises:

receiving, by a conditional generator and from the training data, the text input;

transforming, by the conditional generator, the text input into a generated scanpath;

receiving, by a discriminator and from the training data, the text input;

receiving, by the discriminator, the generated scanpath associated with the text input and the recorded scanpath associated with the text input;

generating, by the discriminator, a first probability that the generated scanpath is a recorded scanpath and a second probability that the recorded scanpath is a recorded scanpath;

training the conditional generator using the first probability, the second probability, the recorded scanpath, and the generated scanpath; and training the discriminator using the first probability and the second probability.

17. The non-transitory computer-readable medium of claim 16, wherein the generating, by the training module, the trained scanpath generation model operation further comprises:

transforming, by a first pre-trained neural network, the text input into a first dense text representation;

conditioning the conditional generator based on the first dense text representation;

transforming, by a second pre-trained neural network, the text input into a second dense text representation; and conditioning the discriminator based on the second dense text representation.

18. The non-transitory computer-readable medium of claim 17, wherein the operation to generate the scanpath generation model further comprises:

transforming, by the conditional generator, the first dense text representation into a reconstruction of the text input; and wherein the operation to train the conditional generator further comprises using the first dense text representation and the reconstruction of the text input.

19. The non-transitory computer-readable medium of claim 15, further comprising:

augmenting one or more natural language processing ("NLP") models using the trained scanpath generation model, wherein the one or more NLP models comprise sentiment analysis, paraphrase detection, or sarcasm detection; and training the one or more NLP models using generated scanpaths generated by the trained scanpath generation model to improve the performance of the one or more augmented NLP models.

20. The non-transitory computer-readable medium of claim 16, further comprising:

augmenting one or more NLP models using the trained scanpath generation model, wherein the one or more NLP models comprise sentiment analysis, paraphrase detection, or sarcasm detection;

determining a gradient based on the performance of the one or more augmented NLP models; and sending the gradient to the conditional generator to improve the performance of the one or more augmented NLP models.

* * * * *